(12) United States Patent
Stearns

(10) Patent No.: US 8,402,689 B2
(45) Date of Patent: Mar. 26, 2013

(54) PRECONFIGURABLE UNDERWATER CRUSTACEAN TRAP

(76) Inventor: George Stearns, Kirkland, WA (US)

( * ) Notice: Subject to any disclaimer, the term of this patent is extended or adjusted under 35 U.S.C. 154(b) by 353 days.

(21) Appl. No.: 12/939,042

(22) Filed: Nov. 3, 2010

(65) Prior Publication Data

US 2011/0271584 A1 Nov. 10, 2011

Related U.S. Application Data

(60) Provisional application No. 61/280,987, filed on Nov. 12, 2009.

(51) Int. Cl.
*A01K 69/06* (2006.01)
*A01K 69/10* (2006.01)

(52) U.S. Cl. .......................................... 43/105; 43/100

(58) Field of Classification Search ................ 43/100, 43/103–105, 65
See application file for complete search history.

(56) References Cited

U.S. PATENT DOCUMENTS

| | | | | | |
|---|---|---|---|---|---|
| 237,231 | A | * | 2/1881 | Atkinson | 43/105 |
| 527,435 | A | * | 10/1894 | Loud, Jr. | 43/65 |
| 544,100 | A | * | 8/1895 | Hurst | 43/65 |
| 973,594 | A | * | 10/1910 | Van Keuren | 43/65 |
| 1,106,318 | A | * | 8/1914 | Ross | 43/105 |
| 2,489,856 | A | * | 11/1949 | Buford | 43/102 |
| 3,300,890 | A | * | 1/1967 | Thomassen | 43/100 |
| 3,337,982 | A | * | 8/1967 | Sajulan | 43/65 |
| 3,605,320 | A | * | 9/1971 | Wells | 43/65 |
| 3,699,702 | A | * | 10/1972 | Lankenau | 43/100 |
| 3,795,073 | A | * | 3/1974 | Olsen | 43/105 |
| 3,939,597 | A | * | 2/1976 | McSherry | 43/105 |
| 4,416,082 | A | * | 11/1983 | Strobel | 43/102 |
| 4,538,376 | A | * | 9/1985 | Morton | 43/100 |
| 4,887,382 | A | * | 12/1989 | Moritz | 43/102 |
| 5,088,230 | A | * | 2/1992 | Moritz | 43/100 |
| 6,195,931 | B1 | | 3/2001 | Johnson | |
| 7,313,887 | B2 | | 1/2008 | Hibbs | |
| 7,610,716 | B2 | | 11/2009 | Philbrook | |

* cited by examiner

*Primary Examiner* — Kimberly Berona
*Assistant Examiner* — Danielle Clerkley
(74) *Attorney, Agent, or Firm* — Farjam Majd

(57) ABSTRACT

A method and a device are disclosed for capturing sea crustaceans, such as crab, lobster, and shrimp. In various embodiments, the disclosed crustacean trap has a tapered body and collapsible trap doors usable for stacking multiple crustacean traps to reduce space requirements for storage, transportation and deployment. Foldable entry doors allow pre set up of traps for commercial and sport fishing fishing applications. The disclosed crustacean trap is configured for single-step and/or single-hand setting up of bait, trap doors, and deployment. The disclosed crustacean trap further includes a body-attached hook, which reduces line and rope tangling during setup and operation.

18 Claims, 5 Drawing Sheets

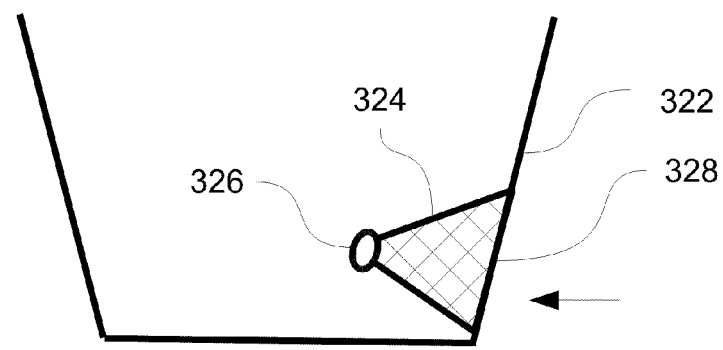
FIGURE 3B
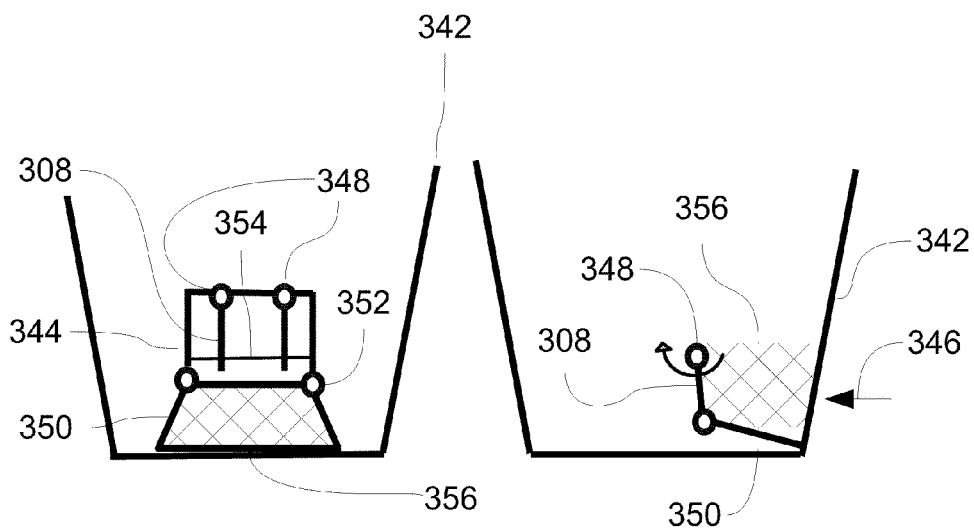
FIGURE 3C'  FIGURE 3C"

PRECONFIGURABLE UNDERWATER CRUSTACEAN TRAP

CROSS-REFERENCE(S) TO RELATED APPLICATION(S)

This application claims the benefit of U.S. Provisional Application No. 61/280,987, filed 12 Nov. 2009, the disclosure of which is hereby expressly incorporated by reference in its entirety, and the filing date of which is hereby claimed under 35 U.S.C. §119(e).

TECHNICAL FIELD

This application relates generally to fishing. More specifically, this application relates to a method and apparatus for capturing crabs, lobsters, and other crustaceans and bottom feeders in the sea.

SUMMARY

In aspects of present disclosure, a stackable crustacean trap is disclosed including a body having tapered sidewalls configured to allow nesting of multiple traps, a trap door configured to limit a depth of nesting of the multiple traps, an access port, a bait hanger, and a rope coupling the access port and the bait hanger. The rope is configured to close the access port and position the bait hanger in one operation when the rope is pulled.

In further aspects of the present disclosure, a pre settable crustacean trap is disclosed including a body having tapered sidewalls configured to allow nesting of multiple traps and a trap door configured to limit a depth of nesting of the multiple traps. When multiple traps are stacked, between each two adjacent stacked traps a storage space is created. The crustacean trap further includes a bait hanger configured to couple to a bait, and a rope coupled to the bait hanger. The rope is configured to position the bait hanger when the rope is pulled. Additionally, the rope, the bait hanger, and the bait fit inside the storage space.

In still further aspects of the disclosure, a crustacean trap is disclosed including a body having tapered sidewalls configured to allow nesting of multiple traps, a foldable trap door configured to fold closed when nesting multiple traps and fold open when the crustacean trap is set up for operation, an access port in an upper surface of the crustacean trap, a bait hanger, and a rope coupling the foldable trap door, the bait hanger, and the access port. The rope is configured to open the foldable trap door, close the access port, and position the bait hanger in one operation when the rope is pulled.

BRIEF DESCRIPTION OF THE DRAWINGS

The drawings, when considered in connection with the following description, are presented for the purpose of facilitating an understanding of the subject matter sought to be protected.

FIGS. 3A-3C" show example different one-way entry doors to the interior of crustacean traps;

DETAILED DESCRIPTION

Figure 1:
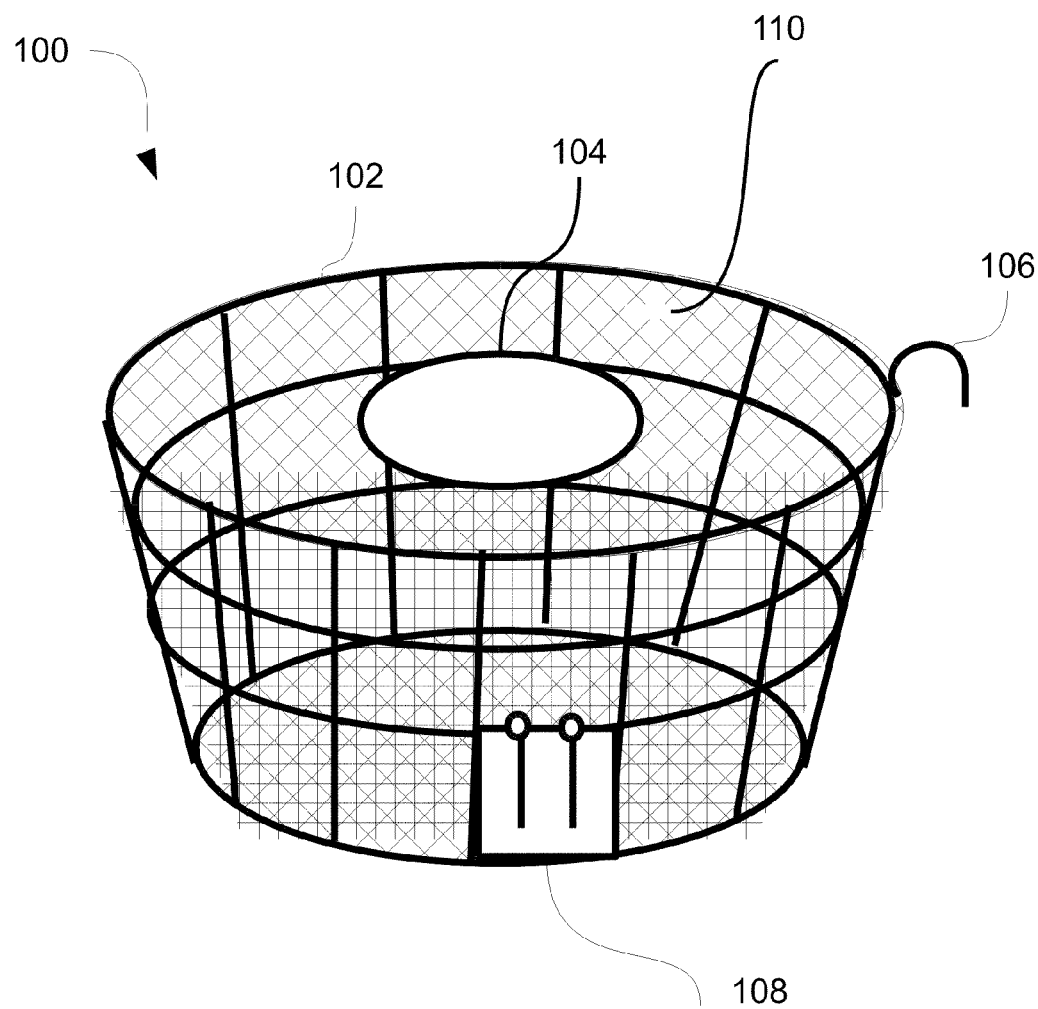
FIG. 1 shows an example stackable crustacean trap with a body-attached hook.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using the trap for capturing crabs, it will be appreciated that the disclosure may be used with other types of crustaceans such as lobsters, and shrimps, and/or other bottom dwelling and/or bottom feeding fish and sea animals, such as sea cucumbers, starfish, and the like.

Briefly described, a method and a device are disclosed for capturing sea crustaceans, such as crab, lobster, and shrimp. In various embodiments, the disclosed crustacean trap has a tapered body and collapsible trap doors usable for stacking multiple crustacean traps to reduce space requirements for storage, transportation and deployment. Foldable entry doors allow pre set up of traps for commercial and sport fishing applications while allowing space saving and storage benefits. The disclosed crustacean trap is configured for single-step and/or single-hand setting up of bait, trap doors, and deployment. The disclosed crustacean trap further includes a body-attached hook, which reduces line and rope tangling during setup and operation.

Crustacean traps may be generally classified as traps used for sport fishing and traps used for commercial fishing. Two generally conflicting requirements often need to be balanced in the design of a crustacean trap, compact storage volume and ease of use. The primary design consideration for sport fishing traps is the ability to store the trap in a compact volume. The compact volume is generally accomplished at the expense of ease of use. In contrast, the primary design consideration for commercial fishing traps is the ease of use. Ease of use is generally accomplished at the expense of the ability to store the traps in a compact volume. To serve both markets of recreational sport fishing/crabbing and commercial fishing, a crustacean trap design is needed, which can be stored in a compact volume and takes little effort to use.

The ease of use for commercial and sport fishing is important because in inclement weather with high waves and high winds, and cramped spaces aboard fishing boats, setting up traps is difficult, time consuming, and potentially dangerous. As such, it is desirable to be able to pre set up the traps on land, stack the traps in a space-efficient manner, transport them aboard the fishing board, and deploy the traps in the appropriate waters. Pre setting up the traps includes, baiting, folding down the trap doors, and stacking the traps on top of each other without interfering with or damaging the setups already done. In commercial fishing operations, ease of use further speeds up operations and efficiency of deploying traps, potentially increasing crustacean harvests and corresponding profits.

Those skilled in the art will appreciate that even though each of the above described requirements of compact storage volume and ease of use is of primary importance in the sport fishing and commercial fishing markets, respectively, both of these requirements are desirable in both markets if such requirements can be met simultaneously without compromising the primary requirement for the respective market.

Additionally, in commercial operations, the side of the trap, including entry doors need to be constructed robustly to withstand the rigors of commercial handling of traps, while at the same time the trap entry doors need to pose a minimal amount of resistance to entering crabs. For example, traps are usually hauled up sideways, forcing a significant amount of stress on the side to the trap due to a pile of live crab being forced to one side. Crabs and other crustaceans generally tolerate little resistance when entering the trap in search of food. Accordingly, to allow crabs to enter through trap doors, the construction of the entry doors need to be light, but strong enough to withstand normal operational stresses described above. Therefore, such conflicting design requirements need to be considered simultaneously.

FIG. 1 shows an example stackable crustacean trap with a body-attached hook. In various embodiments, crustacean trap 100 includes a main body 102, mesh 110 enclosing and covering body 102, an access port 104, a body-attached hook 106, and a one-way inward opening trap door 108. Body 102 of crustacean trap 100 is covered by a mesh and is tapered from top to bottom making the top surface, where access port 104 is located, larger than the bottom surface on which the crustacean trap rests while deployed at the bottom of the sea. This tapered configuration allows multiple crustacean traps 100 to be stacked one on top of and partially enclosed by another, thus providing a compact storage volume for multiple traps. The mesh enclosing body 102 may be made of metal or synthetic material, such as nylon, polyester, and the like, or a combination of both. In various embodiments, body 102 is constructed from a sturdy metal frame enclosed and covered by mesh 110 to separate the interior of the trap from its exterior. A flexible mesh or netting may be used to cover the upper surface of the trap allowing access port 104 constructed within such flexible mesh to be cinched closed by a cinch rope. Typical dimensions for the trap include about a 12 inch height and 30 inch diameter at the top surface. Other dimensions for the trap may be used depending on the type of target crustaceans, fishing operation needs, and the like.

In various embodiments, body-attached hook 106 is configured to be used for hooking and securing a loop in a rope (not shown in FIG. 1; see FIG. 4) that is used to cinch closed access port 104. Placing the hook on the end of the rope often causes entanglement of the hook on the mesh, other traps, other ropes, and the like, causing delays and difficulties in setup, transport, and deployment of the traps. Placing body-attached hook 106 on a fixed position on the trap's body 102 substantially avoids such entanglements.

In various embodiments, different types of trap doors are used, as more fully described with respect to FIGS. 3A-3C" below. Trap door 108 generally opens one way to the interior of the trap, allowing crabs and other crustaceans to easily enter the trap but not exit.

In typical operation, one or more crustacean traps are set up and deployed. The setup of the trap includes placing a bait, such as chicken, fish, bag of food or other similar food source inside the trap through access port 104, cinching access port 104 closed by a rope, setting up the trap doors for one-way operation, and hooking the rope on body-attached hook 106 to secure the trap. The trap may be deployed in sea water to rest on the bottom for capturing crustaceans. The bait is generally placed dangling in substantially the middle spot of the trap to allow food particles and smell to be carried some distance away from the trap to attract crustaceans such as crabs and lobsters. The bait is placed in the middle so that other fish cannot consume the bait from the outside perimeter of the trap. By cinching the trap closed with the rope, the bait is also elevated off the bottom. This arrangement allows the bait scent to travel farther and faster in the sea currents than a bait, which is laid down on the bottom, thus, attracting crustaceans over a wider area in the vicinity of the trap. A buoy is attached to the trap via a line extending from the buoy on the surface down to the trap on the sea floor, marking its location on the water surface. After a sufficient period of time the trap is retrieved, crustaceans are removed and the trap may be re-baited at this time to repeat the fishing process. Different sizes of the trap may be utilized to allow use in nearly any crustacean fishery.

Figure 2:
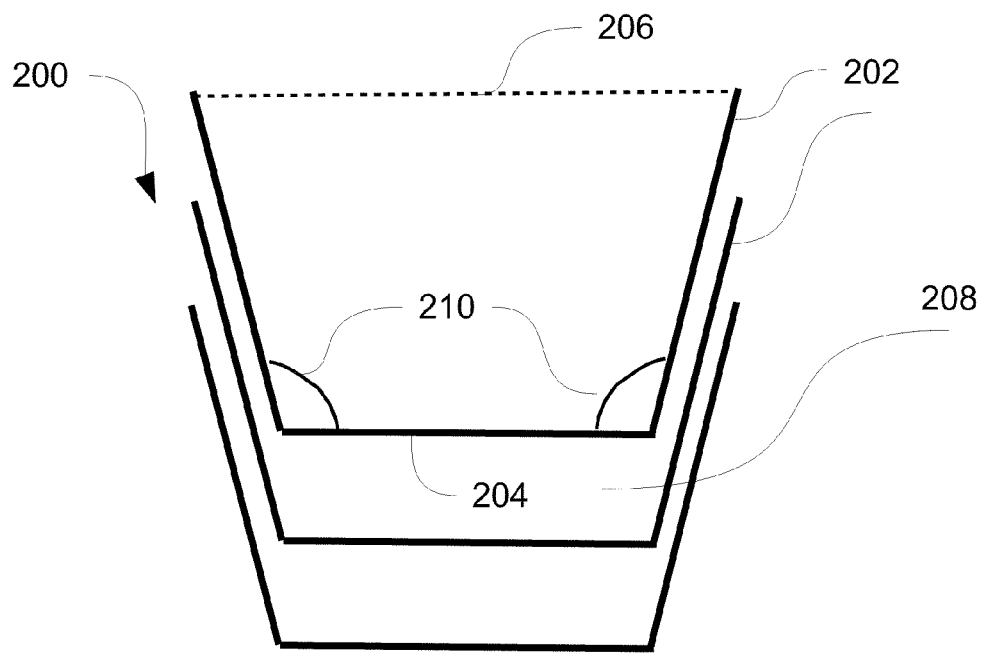
FIG. 2 shows an example stacking of several crustacean traps.

FIG. 2 shows an example stacking of several crustacean traps. In various embodiments, trap stacking or nesting configuration 200 is made possible by the tapered side walls 202 of the crustacean traps. The top-down taper of the crustacean traps' bodies create bottom surface 204, which is smaller than top surface 206, allowing the traps to be stacked one on top of and partially enclosed by another, thus providing a compact storage volume for multiple traps, as shown in FIG. 2. Furthermore, by placing the access port on the top surface, unlike some existing traps, the most fragile part of the trap, top surface 206, which is covered with flexible netting made of rope, is kept off the bottom, increasing the useful life of the trap, reducing maintenance, reducing replacement of parts, and reducing entanglements of ropes and netting with rocks and sea plants. Additionally, a space 208 between the bottom of an upper trap in the stack and the bottom of a lower trap in the stack provides sufficient space between the two traps to place the pre set up bait, ropes, nettings, and other pieces of the lower trap. Space 208 is created by various techniques, such as placing physical stops inside the trap on side walls 202, or reducing angle 210 of side walls 202, to stop the bottom of the upper trap from sinking deeper into the lower trap. In various embodiments, the trap doors for entry of crustaceans are used as physical stops for the upper traps, limiting the depth of nesting of multiple traps.

Figure 3A:
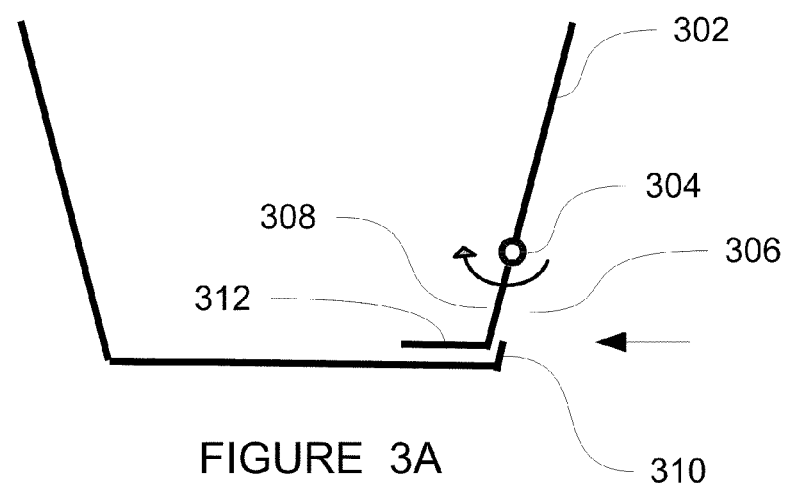

FIGS. 3A-3C" show example different one-way entry doors to the interior of crustacean traps.

FIG. 3A shows a trap door 308 integrated with side wall 302 of the trap and pivoted around pivot point 304. In various embodiments, a physical stop 310 prevents trap door 308 from opening outwards and limits trap door 308 to opening inwards only as indicated by the direction arrow. In other embodiments, trap door 308 includes a horizontal section or platform 312 on which a crab must stand to approach trap door 308, further preventing the crab from opening trap door 308 by pulling it inwards while prying with its claws. Trap door 308 is generally coupled with side wall 302 in a free hanging configuration and normally kept closed by gravity. In various embodiments pivot point 304 is formed by a hinge. In other embodiments, pivot pint 304 is formed by a wire loop in or attached to trap door 308 and wrapped around bars forming side wall 302. Crustaceans can push trap door 308 open inwards through entrance 306 to get to the bait hanging in the center of the trap, but cannot exit once inside the trap. In other embodiments, multiple trap doors 308 are distributed along the perimeter of the trap so that crabs can approach and enter the trap from any direction. The embodiments discussed above with respect to FIG. 3A provide maximal internal trap space for harvesting crustaceans by occupying minimal space for the trap doors, allowing the overall size of the trap to be reduced for a given particular amount of desired internal trap space.

FIG. 3B shows a conical and/or tapered trap door 324 with an exit opening 326 deep inside the interior of the trap, effectively forming a tunnel connecting the exterior of the trap to the interior of the trap. In various embodiments, the body of conical trap door 324 is enclosed in a wire mesh and is attached to side wall 322. In some embodiments, the body of conical trap door 324 may be attached or be an extension of the netting or mesh covering top surface 206. In other embodiments, the body of conical trap door is made of netting or sheeting material, such as metal or plastic sheeting. Once a crustacean, such as a crab, enters conical trap door 324 through entrance 328, the crustacean exits the tunnel at exit opening 326 to access the bait hanging near exit opening 326 and is trapped inside. The crustacean cannot get back into the tunnel from the side of exit opening 324 because this exit is located above the ground level of the trap (bottom surface of the trap) and crustaceans can only walk and cannot swim upwards to enter the doorway tunnel through exit opening 326. Additionally, to escape, crustaceans instinctually try to move away from the center of the trap and are unlikely to go towards and exit through conical exit opening as it is located near the center of the trap and appears to them to be more of an obstruction to escape than an escape route.

FIGS. 3C' and 3C" show a front view and a side view of a folding trap door, respectively.

With reference to FIG. 3C', in various embodiments, the trap door includes an inwardly and upwardly inclined ramp 350 enclosed in mesh 356, a folding frame 344 coupled with inclined ramp 350 via base pivot points 352, one or more entry bars 308 coupled with folding frame 344 via entry pivot points 348, and a stop bar 354. In various embodiments, the above-mentioned pivot points are implemented using hinges, while in other embodiments the pivot points are formed by wire loops coupling the respective parts.

With reference to FIG. 3C" now, in various embodiments, entry 346 to trap door is used by crustaceans to step onto inclined ramp 350 towards folding frame 344 and entry bars 308. Once the crustaceans exit the other side of entry bars 308 into the interior of the trap, they cannot go back through the trap door because of the stop 354 preventing entry bars 308 from opening outwardly, and also the position of the entry bars above the floor of the trap, as described above with respect to FIG. 3B. In various embodiments, stop bar 354 is part of included ramp 350. In other embodiments, other techniques may be used to stop entry bars, such as motion limiting spurs near the pivot points, cables or chains limiting movement in the desired direction, and the like.

In various embodiments, folding frame 344 is folded onto inclined ramp 350 around pivot points 352 to allow stacking of multiple traps. Inclined ramp 350 may also act as a stop to limit nesting depth of stacked traps. Mesh 356 may be implemented using flexible netting to limit the extension of folding frame 344 away from inclined ramp 350 when opened for operation. When stacking traps, flexible mesh 356 folds down to allow folding frame 344 to be folded down.

During operation, a crustacean walking up inclined ramp 350 towards the interior of the trap to access the bait, can push through entry bars 308 inwardly and crawls or falls down into the trap's interior. Entry bars 308 rotate around pivot points 348 to open inwardly.

Figure 4:
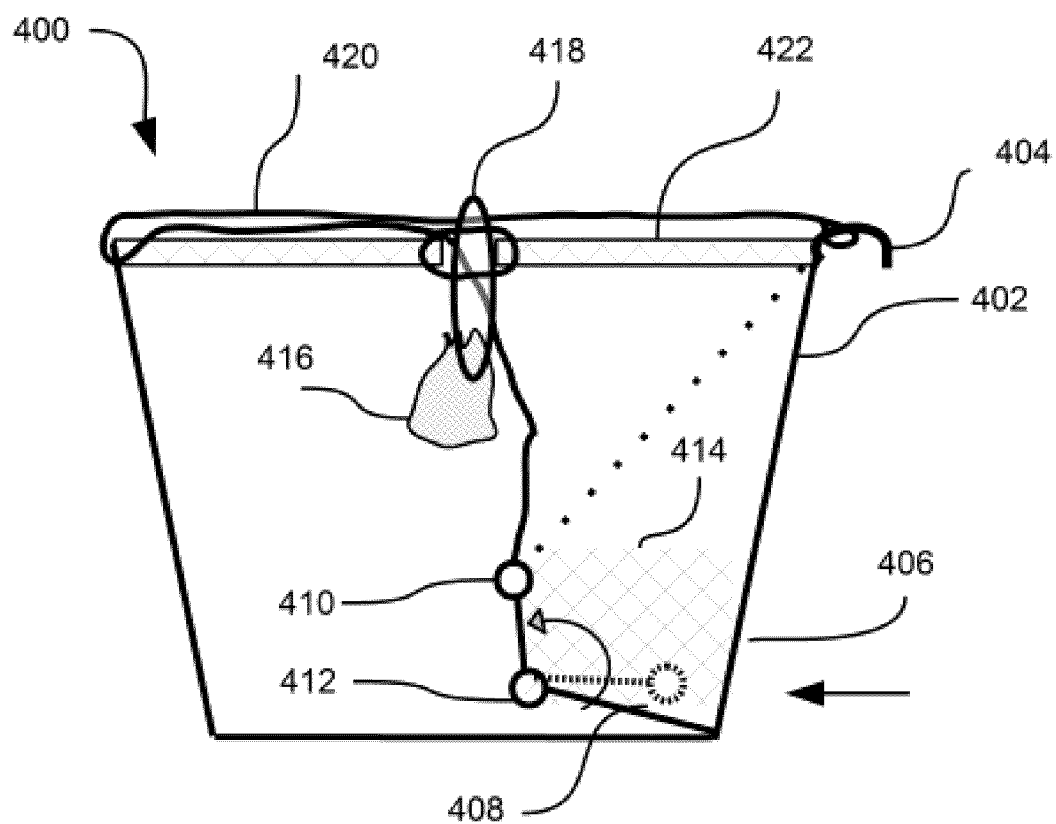
FIG. 4 shows an example crustacean trap configured for single-step setup.

FIG. 4 shows an example crustacean trap configured for single-step setup. In various embodiments, trap 400 includes side walls 402, hook 404 attached to side wall 402, upper surface 422 having an access port 104 (see FIG. 1) substantially elevated above the bottom and in the middle of the trap through which a bait hanger 418 may be extended inwards, bait bag or bait 416 coupled with bait hanger 418, a trap door having an entry 406, enclosed by flexible mesh 414, inclined ramp 408 coupled to folding frame 344 (see FIGS. 3C' and 3C"), entry pivot points 410, base pivot points 412, and a rope 420 coupled with folding frame 344 and access port 104. In various embodiments, flexible mesh 414 may be attached or be an extension of the netting or mesh covering upper surface 422, as indicated by the dotted line.

In various embodiments, rope 420 is coupled with folding frame 344, is routed through an opening in bait hanger 418, loops around access port 104 for cinching, and passes through the mesh covering upper surface 422 or another hook at a location substantially opposite hook 404 near upper surface to create tension in the rope and keep the trap set up for operation. At the opposite end of rope 420, a loop is provided for hook 404 to pass through and hold the rope in tension when the trap is ready for operation. In some embodiments, rope 420 may be elastic or have an elastic section to actively maintain tension when pulled. The elastic section may be a rubber band, a spring, or the like.

In operation, pulling rope 420 causes access port 104 to be cinched or otherwise be pulled closed while substantially simultaneously causes bait 416 to be lifted and positioned in the center of the trap, and further causes folding frame 344 to be opened/raised into working position. The loop in rope 420 may be hooked on to hook 404 to maintain tension in the rope and keep the trap in operating configuration. An operator/user of trap 400 may previously set up the trap by placing bait bag or bait 416 directly onto bait hanger 418 and the trap is ready for use. This operation may be substantially performed by a single hand by pulling and hooking the rope onto hook 404.

When stacking multiple traps for transportation or storage, unhooking rope 420 from hook 404 causes folding frame 344 to rotate downward to lay on top of inclined ramp 408, as shown by dotted line outline in FIG. 4, flexible mesh 414 to collapse and fold down, and the bait hanger and/or the bait to lay on the bottom surface of the trap.

Figure 5:
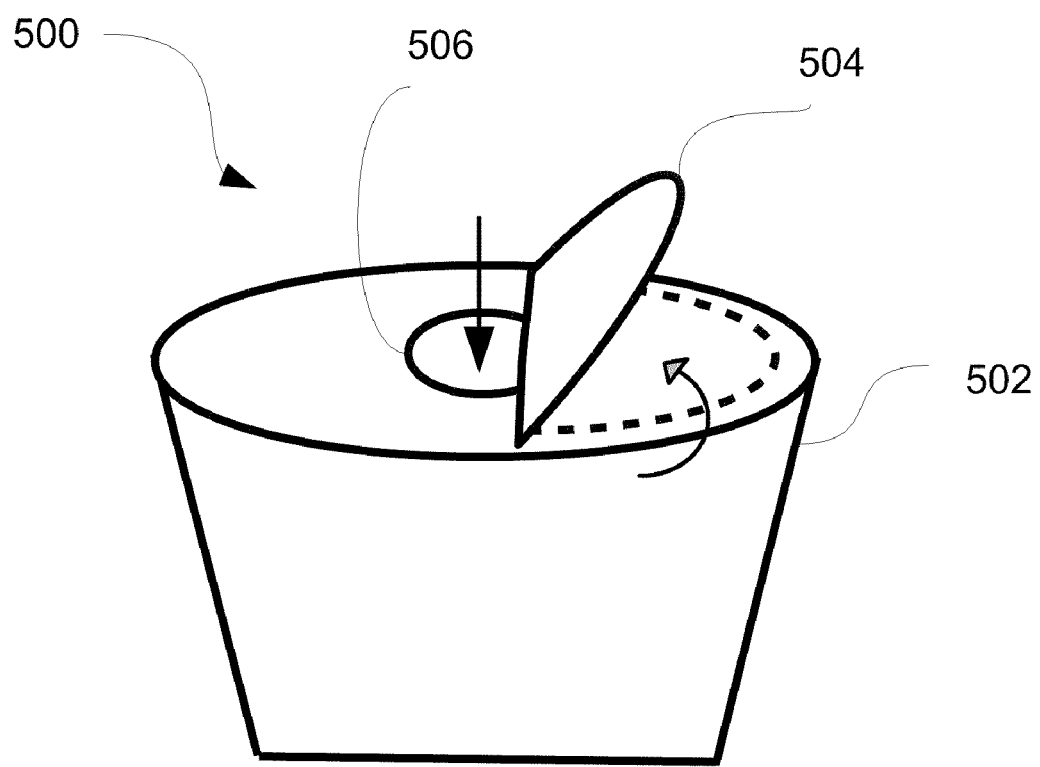
FIG. 5 shows an example crustacean trap with dual retrieval ports.

FIG. 5 shows an example crustacean trap with dual retrieval ports. In various embodiments, trap configuration 500 may include a small access port 506 and a large access port 504 to remove captured crustaceans, such as crabs, lobsters, and shrimp from the trap. To use small access port 506, rope 420 (see FIG. 4) may be loosened to open small access port 506 (similar to access port 104 of FIG. 1). The operator/user may then reach through small access port 506 to remove the crustaceans. In commercial operations where speed of operation is important, removing all crustaceans together and/or quickly through large access port 504 may be desirable. In such commercial operations, larger traps loaded with crustaceans may be too heavy to lift manually. For these cases, a mechanical puller may be used to lift one side of the trap opposite large access port 504 and empty the trap contents at once. When not in use, access port 504 may be secured to side wall 502.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A stackable crustacean trap comprising: a body having an upper surface, a base, and tapered sidewalls extending from the upper surface to the base configured to allow nesting of multiple traps; at least one one-way trap door on a portion of the tapered sidewalls configured to limit a depth of nesting of multiple traps; an access port in the upper surface of the trap; and a rope coupling with both the access port and a bait hanger, wherein the rope is configured to cinch closed the access port and elevate and position the bait hanger within the trap in one operation when the rope is pulled.

2. The stackable crustacean trap of claim 1, further comprising a mesh enclosing the crustacean trap.

3. The stackable crustacean trap of claim 2, wherein the mesh comprises a metal mesh.

4. The stackable crustacean trap of claim 2, wherein the mesh comprises a flexible mesh.

5. The stackable crustacean trap of claim 1, wherein the trap door comprises a conical tunnel with an exit opening positioned in an interior space of the trap door.

6. The stackable crustacean trap of claim 1, wherein the trap door comprises a foldable frame coupled with an inclined ramp.

7. The stackable crustacean trap of claim 6, wherein the trap door further comprises a flexible mesh, which limits an extent to which the foldable frame opens.

8. The stackable crustacean trap of claim 1, wherein the access port comprises a hole within a flexible mesh.

9. The stackable crustacean trap of claim 1, wherein the bait hanger is configured to be coupled to a bait bag or a bait directly.

10. A pre settable crustacean trap comprising: a body having an upper surface, a base, and tapered sidewalls extending from the upper surface to the base configured to allow nesting of multiple traps; at least one one-way trap door on a portion of the tapered sidewalls configured to limit a depth of nesting of multiple traps, wherein when multiple traps are stacked, between each two adjacent stacked traps a storage space is created; an access port in the upper surface of the trap; and a rope coupled to both the access port and a bait hanger configured to couple to a bait, wherein the access port is closeable by cinching the rope, wherein the rope is configured to elevate and position the bait hanger within the trap when the rope is pulled, and wherein the rope, the bait hanger, and the bait fit inside the storage space.

11. The pre settable crustacean trap of claim 10, further comprising a mesh enclosing the crustacean trap.

12. The pre settable crustacean trap of claim 10, wherein the trap door comprises a conical tunnel with an exit opening positioned in an interior space of the trap door.

13. The pre settable crustacean trap of claim 10, wherein the trap door comprises a foldable frame coupled with an inclined ramp.

14. The pre settable crustacean trap of claim 10, wherein the rope is configured to cause the access port to be closed and the trap door to be configured to open inwardly, when the rope is pulled.

15. A crustacean trap comprising: a body having an upper surface, a base, and tapered sidewalls extending from the upper surface to the base configured to allow nesting of multiple traps; at least one one-way foldable trap door on a portion of the tapered sidewalls configured to fold closed when nesting multiple traps and fold open when the crustacean trap is set up for operation; an access port in an upper surface of the crustacean trap; and a rope coupling the foldable trap door, a bait hanger, and the access port, wherein the rope is configured to open the foldable trap door, cinch closed the access port, and elevate and position the bait hanger within the trap in one operation when the rope is pulled.

16. The crustacean trap of claim 15, further comprising a hook attached to the sidewalls configured to receive a loop in the rope.

17. The crustacean trap of claim 15, further comprising a mesh substantially enclosing the crustacean trap.

18. The crustacean trap of claim 15, wherein the foldable trap door comprises an inclined ramp rotatably coupled to a folding frame.

\* \* \* \* \*